United States Patent [19]
Wortel

[11] Patent Number: 5,820,241
[45] Date of Patent: *Oct. 13, 1998

[54] BEAM-COMBINING DEVICE AND COLOR IMAGE PROJECTION APPARATUS PROVIDED WITH SUCH A DEVICE

[75] Inventor: Franciscus J. M. Wortel, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 789,774

[22] Filed: Jan. 27, 1997

Related U.S. Application Data

[63] Continuation of Ser. No. 646,758, May 1, 1996, abandoned, which is a continuation of Ser. No. 391,813, Feb. 21, 1995, abandoned.

[30] Foreign Application Priority Data

May 6, 1994 [EP] European Pat. Off. ............... 94201262

[51] Int. Cl.[6] .................................................... G03B 21/14
[52] U.S. Cl. ................................. 353/31; 353/69; 353/34; 359/634
[58] Field of Search ................................. 353/31, 34, 37, 353/22, 69, 98, 99; 348/757, 780; 359/618, 629, 634, 637, 639

[56] References Cited

U.S. PATENT DOCUMENTS 4,615,595  10/1986  Hornbeck ................................. 353/122
4,754,272   6/1988  Illerberg et al. ......................... 359/634
4,969,730  11/1990  Van Den Brandt ....................... 353/31
5,046,837   9/1991  Stroomer et al. .......................... 353/82
5,200,857   4/1993  Matsushita ............................. 359/634
5,231,431   7/1993  Yano et al. ................................ 353/31

FOREIGN PATENT DOCUMENTS 5-27343   2/1993  Japan .
527343    2/1993  Japan .
6082744   3/1994  Japan ...................................... 359/40

OTHER PUBLICATIONS

"New Liquid Crystal Polarized Color Projection Principle", Schadt et al, Japanese Jornal of Applied Physics, vol. 29, No. 10, Oct., 1990, pp. 1974–1984.

Primary Examiner—William Dowling
Attorney, Agent, or Firm—F. Brice Faller

[57] ABSTRACT

An optical device for combining three sub-beams of different colors to one color beam is disclosed having a first and a second color-selective reflector arranged on transparent plate-shaped substrates, the first reflector reflecting a first of said sub-beams, the second reflector reflecting the first sub-beam and a second of said sub-beams and a third of said sub-beams passing through the second reflector and its substrate. A transparent plate is arranged in the path of the first sub-beam and in front of the first reflector, the transparent plate having a product of refractive index and thickness equal to that of the substrates of the first and second reflectors. An astigmatism correcting element is positioned in the path of the color beam.

4 Claims, 3 Drawing Sheets

BEAM-COMBINING DEVICE AND COLOR IMAGE PROJECTION APPARATUS PROVIDED WITH SUCH A DEVICE This is a continuation of application Ser. No. 08/646,758, filed May 1, 1996, abandoned, which is a continuation of application Ser. No. 08/391,813 filed Feb. 21, 1995, abandoned.

BACKGROUND OF THE INVENTION

The invention relates to an optical device for combining three sub-beams of different colours to one colour beam, which device comprises two colour-selective reflectors arranged on transparent plate-shaped substrates.

A device of this type may be used, for example in a colour image projection apparatus for combining three sub-beams emitted by three primary image sources generating three monochromatic images, each in a different colour, of one and the same scene to one colour beam which is applied to one projection lens system. Thus, the three monochromatic images can be projected as one image on a projection screen.

A device for combining three differently coloured sub-beams emitted by three liquid crystalline picture display panels, hereinafter referred to as LCD panels, is described, inter alia in U.S. Pat. No. 5,046,837. This device comprises two colour-selective reflectors in the form of dichroic mirrors, each arranged on a glass substrate. One of the sub-beams, for example the green beam is reflected by the two mirrors while the two other sub-beams, the red and the blue beam are reflected once by a dichroic mirror and pass the substrate of a mirror once. Since these mirrors are arranged obliquely in the sub-beams, for example at an angle of 45° to the axis of the sub-beams and the sub-beams are converging 6 cams at the area of the mirrors, a sub-beam passing through the substrate of a mirror will become astigmatic, which means that this beam has different convergences in two mutually perpendicular planes comprising the beam axis. Consequently, the beam will not be sharply focused on the projection screen in said two planes so that the projected image exhibits an aberration. Since the mirrors are arranged in an imaging optical system, they should have a high degree of planeness, which can only be achieved by making use of relatively thick substrates so that said astigmatism is relatively large. This astigmatism only occurs in two of the three sub-beams. Consequently, the distortion in the projected colour image cannot be corrected by adapting the projection lens system.

To meet this drawback, it is proposed in the Abstract of Japanese Patent Application (JP-A) 5-27343 to render the astigmatism in the three sub-beams equal by adding an extra substrate having the same thickness as the original substrate to each of the dichroic mirrors in such a way that each of the sub-beams passes a substrate twice on its path from the LCD panel to the projection lens system. It is noted in (JP-A) 5-27343 that the now equal astigmatism of the sub-beam can be corrected by the projection lens system, so that this system must be adapted. However, the astigmatism is now twice as large as the astigmatism in the device in which no extra substrates are added to the dichroic mirrors, so that the required correction is more difficult to realise.

SUMMARY OF THE INVENTION

It is an object of the invention to provide a device in which the astigmatism is corrected in a simpler manner. This device is characterized in that in the path of the sub-beam which is reflected by the two colour-selective reflectors, a transparent plate is arranged in front of the first reflector which plate has such a product of refractive index and thickness and is arranged at such a position that the last-mentioned sub-beam effectively traverses the transparent plate, said product of which is equal to that of the substrate of the second reflector, and in that the device is provided with an astigmatism-correcting element.

In this device no more astigmatism is supplied to the sub-beams than is absolutely necessary to render the astigmatism of the three sub-beams equal, so that the astigmatism can easily be corrected. Moreover, by adding the correction element, this device constitutes an assembly which is corrected in itself so that it is no longer necessary to take measures in an optical system arranged downstream or upstream of the device in an apparatus in which this device is used.

It is to be noted that an image projection apparatus is described in the Abstract of Japanese Patent Application (JP-A) 4-149426, in which a cylindrical lens is arranged as a correcting element between the beam-combining device and the projection lens system. However, in said device the astigmatism of the different beams is not rendered equal so that no colour beam which is free from astigmatism for all colours can be obtained with this device.

A first embodiment of the device is further characterized in that a single transparent plate having a product of refractive index and thickness which is equal to that of each of the substrates of the reflectors is arranged in the path of said sub-beam and outside the paths of the other sub-beams.

This embodiment has the advantage that each sub-beam traverses only one transparent plate, i.e. only two transitions from plate material to surrounding medium so that possible reflections are limited to a minimum.

An embodiment in which substantially no extra space is necessary for the extra plate is characterized in that the first reflector is arranged between two substrate plates each having a product of refractive index and thickness which is half that of the substrate of the second reflector.

The invention further relates to a colour image projection apparatus comprising three primary image sources for supplying three differently coloured images of one scene, a beam recombination device for combining three sub-beams emitted by the image sources to one colour beam and a projection lens system for projecting this beam on a projection screen. This apparatus is characterized in that the beam recombination device is implemented as described hereinbefore.

The term scene should be considered to have a wide meaning and comprises a television image, graphic information, numerical information or a combination thereof. The primary image sources may be constituted by liquid crystalline picture display panels, picture display panels whose operation is based on dispersion, for example PDLC (Polymer Dispersed Liquid Crystal), panels comprising a matrix of small mirrors, referred to as DMDs (Digital Mirror Devices), or cathode ray tubes.

These and other aspects of the invention will be apparent from and elucidated with reference to the embodiments described hereinafter.

DETAILED DESCRIPTION OF THE DRAWING

Figure 1:
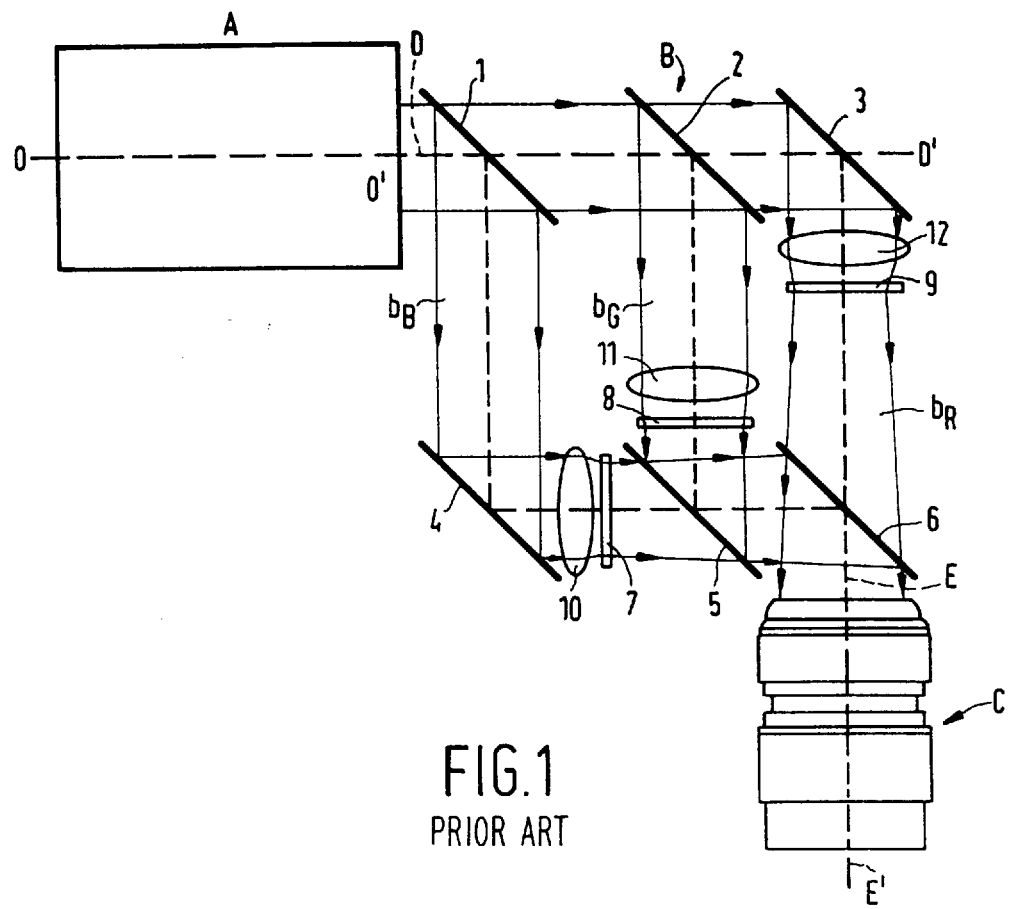
FIG. 1 shows diagrammatically a colour image projection apparatus in which the invention can be used.

The invention will now be described in greater detail in regard to figures of the drawing.

FIG. 1 shows diagrammatically an embodiment of a colour projection television apparatus. This apparatus comprising three main sections: the illumination system A, the image display system B and a projection lens system, for example a zoom lens C. The principal axis 00' of the illumination system is in alignment with the optical axis DD', which is first divided into three sub-axes, which sub-axes are later joined to one optical axis coinciding with the optical axis EE' of the projection lens system.

The beam coming from the illumination system A is incident on a colour-selective reflector 1, for example a dichroic mirror which reflects, for example the blue colour components $b_B$ and transmits the rest of the beam. This beam portion reaches a second colour-selective reflector 2 which reflects the green colour component $b_G$ and transmits the remaining red colour component $b_R$ to a reflector 3 which reflects the red beam towards the projection lens system. The reflector 3 may be a neutral reflector or a reflector which is optimized for red light. The blue beam is reflected by a neutral or blue-selective reflector 4 to a display panel 7 in the form of a liquid crystalline panel. This panel is electronically driven in known manner so that the blue component of the image to be projected appear on this panel. The beam modulated with the blue information reaches the projection lens system C via a colour-selective reflector 5 which passes the blue beam and reflects the green beam, and a further colour-selective reflector 6 which reflects the blue beam. The green beam $b_G$ traverses a second display panel 8 where it is modulated with the green image component and is then reflected towards the projection lens system C successively by the colour-selective reflectors 5 and 6. The red beam $b_R$ traverses a third display panel 9 where it is modulated with the red image component and subsequently reaches the projection lens system via the colour-selective reflector 6.

The blue, red and green beams are superimposed at the input of this lens system so that a colour image is produced which is imaged by this system in a magnified form on a projection screen which is not further shown in FIG. 1.

The optical path lengths between the output of the illumination system A and each of the display panels 7, 8 and 9 are preferably equal so that the cross-section of the beams $b_B$, $b_G$ and $b_R$ are equal at the area of their display panel. Also the optical path lengths between the display panels 7, 8 and 9 and the entrance aperture of the projection lens system are preferably equal so that the differently coloured scenes are satisfactorily superimposed on the projection screen.

Additional lenses 10, 11 and 12 may be arranged in front of the display panels 7, 8 and 9, which lenses ensure that all radiation from the exit face of the illumination system is concentrated in the entrance pupil of the projection lens system C.

Figure 2:
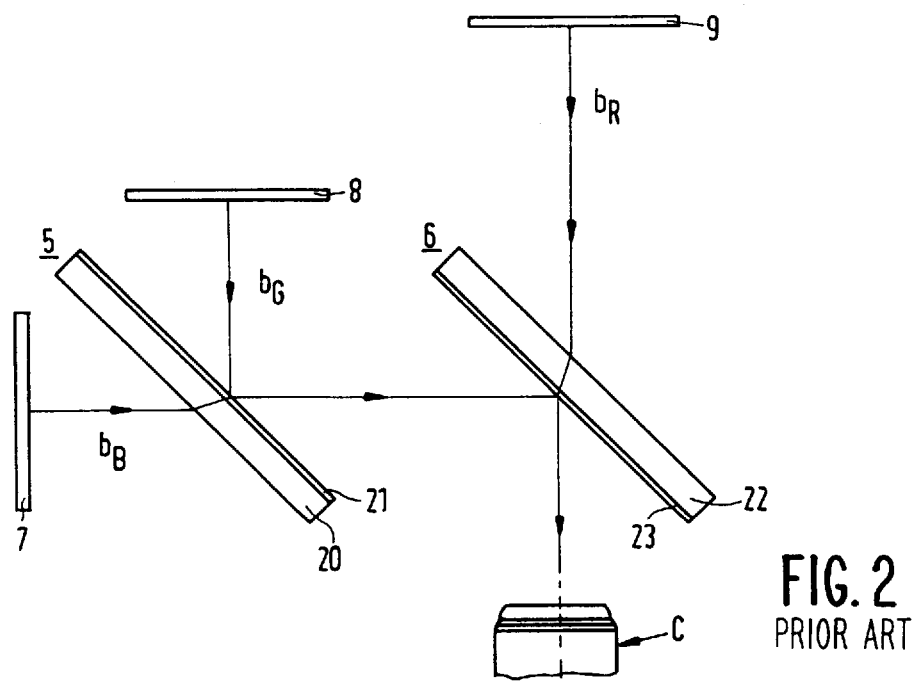
FIG. 2 shows a known beam recombination device for use in this apparatus.

FIG. 2 shows a conventional beam recombination device in detail. The colour-selective reflectors 5 and 6 comprise reflecting layers 21 and 23 provided on transparent, for example glass substrates 20 and 22, respectively. The green sub-beam $b_G$ from the panel 8 is reflected by the reflecting layer 21 and the reflecting layer 23 on its path to the projection lens system C without traversing one of the substrates 20 and 22. The red and blue sub-beams $b_R$ and $b_B$ each traverse a substrate 22 and 20, respectively, once so that astigmatism is introduced into these sub-beams. If the projection lens system C were corrected for this astigmatism, astigmatism would be produced in the green sub-beam traversing this system so that no total correction can be realised.

Figure 3:
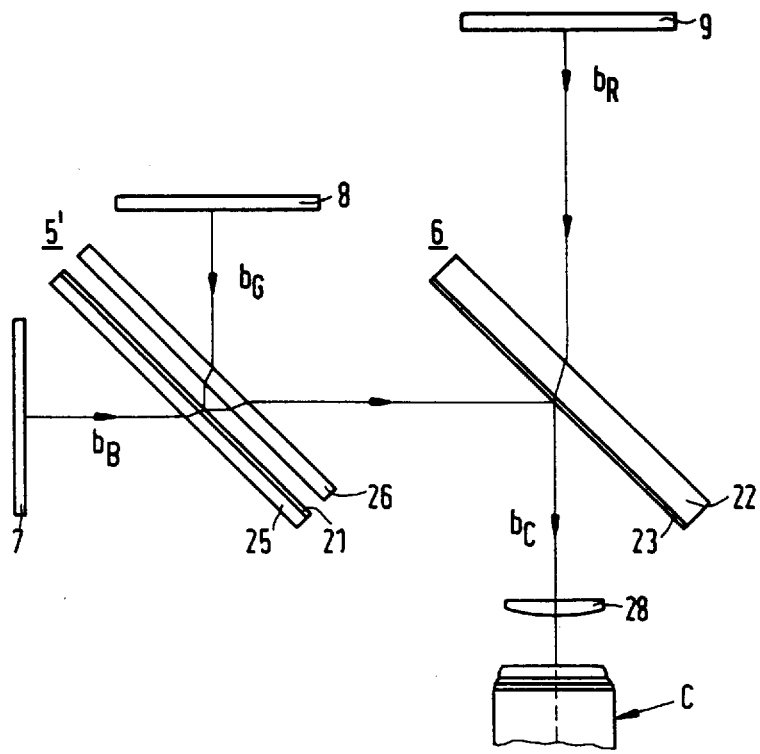
FIG. 3 shows a first embodiment of a beam recombination device according to the invention.

This problem is solved in the beam recombination device according to the invention which is shown in FIG. 3. In this device the colour-selective layer 21 is provided on a substrate 25 whose thickness is half that of the substrate 22 of the element 6. A second substrate, or plate 26, having the same thickness as the substrate 22 is provided above the layer 21. The substrates 25 and 26 have the same refractive index as the substrate 22. On its path from the panel 8 the green sub-beam $b_G$ traverses the substrate 26, is subsequently reflected by the layer 21, traverses the substrate 26 for the second time and is subsequently reflected towards the projection lens system C by the layer 23. The blue sub-beam $b_B$ first traverses the substrate 25 and subsequently the substrate 26 and is then reflected by the layer 23. Consequently, the sub-beams $b_G$ and $b_B$ traverse a substrate thickness twice, which thickness is equal to half the thickness of the substrate 22 which is traversed by the red sub-beam $b_R$ so that all sub-beams effectively traverse substrates of equal thicknesses and refractive indices and at the same angle. The same astigmatism is introduced into these sub-beams, which astigmatism is equal to that in the beams $b_R$ and $b_G$ in the device of FIG. 2. Since the astigmatism in the three sub-beams is equal, it can be corrected by one element, such as a cylindrical lens 28, in the path of the combined beam $b_c$. The beam recombination device with the correction element 28 constitutes a self-corrected device so that it can be accommodated in an apparatus without having to adapt further optical systems of this apparatus.

Instead of a cylindrical lens, another correction element such as an obliquely arranged plane-parallel plate, a wedge, a prism or an obliquely arranged spherical lens may be used.

Figure 4:
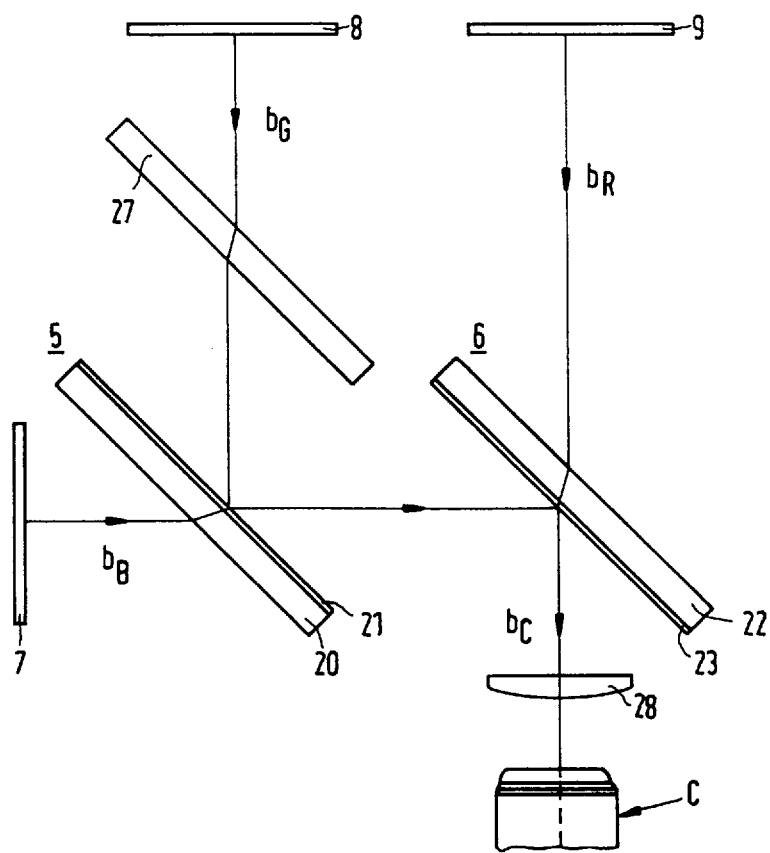
FIG. 4 shows a second embodiment of a beam recombination device according to the invention.

FIG. 4 shows a second embodiment. The colour-selective reflectors 5 and 6 are the same as those in FIG. 4. The path which is traversed by the green sub-beam $b_G$ only now incorporates a transparent substrate 27 which has the same refractive index and the same thickness as the substrates 20 and 22. On their path to the reflector 6, the sub-beams $b_G$ and $b_B$ meet a transition between plate or substrate material and the surrounding medium only twice instead of four times, as in FIG. 3, so that the risk of false reflections is smaller than in the device of FIG. 3. In embodiments of the image projection apparatus in which there is little space between the LCD panel D and the reflector 5, the solution of FIG. 3 is preferred.

In the embodiments described the refractive index itself and the thickness itself of the plate 27 and of the substrates 25 and 26 need not be equal to, or half that of the substrate 22. It is sufficient when the products of refractive index and thickness of 27 and 25 and 26 are equal to or half this product for 22.

The invention may also be used in an image projection apparatus in which three cathode ray tubes are used for supplying the red, the green and the blue image. Such an apparatus resembles the device shown in FIG. 3 in which, however, the panels 7, 8 and 9 are then replaced by cathode ray tubes. In this apparatus the illumination system A and the reflectors 1, 2, 3 and 4 of FIG. 1 are absent.

The invention may be further used in a colour image projection apparatus in which reflecting picture display panels are used, such as LCD panels having a reflector or panels comprising a matrix of tiltable mirrors which can be driven individually. The last-mentioned panels which are known under the name of DMD (Digital Mirror Device) are described inter alia in U.S. Pat. No. 4,615,595.

Figure 5:
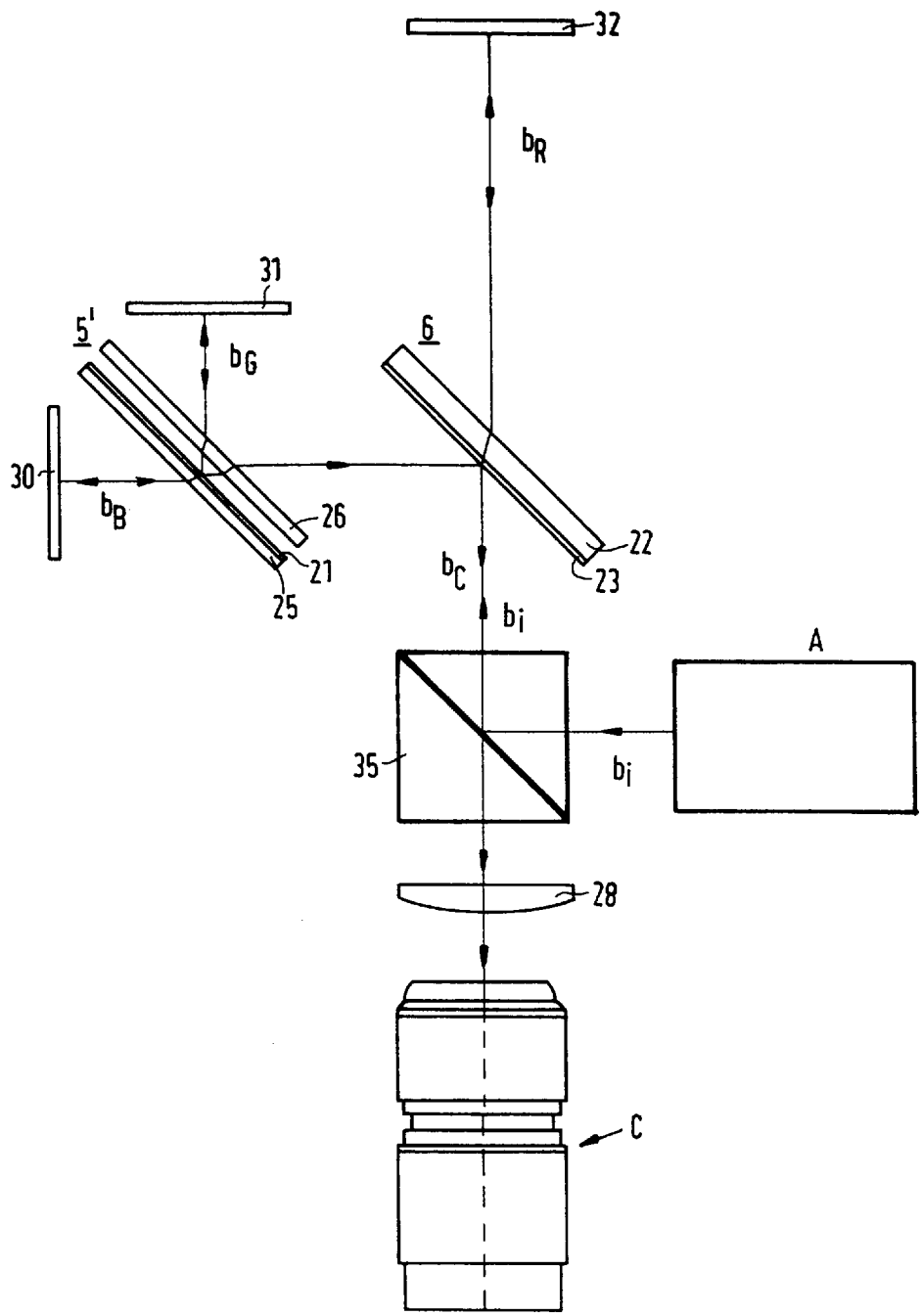
FIG. 5 shows a colour image projection apparatus with reflective image display panels in which the invention is used.

FIG. 5 shows the diagram of an embodiment of this apparatus in which the beam recombination device is also used as a beam-splitting device. After the foregoing description this device does not need any further explanation. To spatially separate the sub-beams reflected by the panels 30, 31 and 32 are from the sub-beams incident on these panels, it may be ensured, for example that the angle of incidence of the last-mentioned sub-beams is larger than zero degrees. To limit the dimensions of the projection apparatus, a beam-separating element 35 is preferably used, which reflects the beam $b_i$ coming from the illumination system A towards the panels and passes the combined beam $b_c$ towards the projection lens system C. To minimize the loss of light, the element 35 is preferably implemented as a TIR (Total Internal Reflection) element as described in U.S. Pat. No. 4,969,730.

As already noted, the colour-selective elements 5 and 6 may be constituted by dichroic mirrors. In that case the layers 21 and 23 in FIGS. 3, 4 and 5 comprise a plurality of sub-layers having given refractive indices and given thicknesses, which sub-layers jointly ensure that light of a given colour is passed and light of other colours is reflected. It is alternatively possible to use cholesteric filters as colour-selective reflectors, as described in the article "New liquid crystal polarized colour projection principle" in "Japanese Journal of Applied Physics", vol. 29, no. 10, October 1990, pp. 1974–1984. A cholesteric mirror has an optical layer of liquid crystalline material with a spiral or helix-like structure having a given pitch. Such a mirror reflects circularly polarized light having a direction of rotation which corresponds to the direction of rotation of the molecular helix and having a wavelength which is adapted to the pitch of the molecular helix, and which transmits light at other wavelengths.

Apart from its use in the apparatuses described above, the invention may generally be used in imaging optical systems in which sub-beams of different colours must be combined to one beam by means of plate-shaped colour-selective reflectors.

I claim:

1. An optical device for combining three sub-beams of different colors to one color beam, the optical device comprising:

a first color-selective reflector positioned between two transparent substrates and a second color-selective reflector arranged on a transparent substrate, the first reflector reflecting a first and transmitting a second of said sub-beams, the second reflector reflecting the first and second sub-beams, a third of said sub-beams passing through the second reflector and its substrate, wherein the two substrates adjacent said first reflector each have a product of refractive index and thickness equal to half that of the substrate of the second reflector, and wherein each sub-beam effectively passes through a substrate having a product of refractive index and thickness equal to that of the second substrate; and an astigmatism correcting element in the path of the color beam.

2. A colour image projection apparatus comprising three primary image sources for supplying three differently coloured images of one scene, a beam recombination device for combining three sub-beams emitted by the image sources to one colour beam and a projection lens system for projecting said beam on a projection screen, characterized in that the beam recombination device is a device as claimed in claim 1.

3. An optical device for combining three sub-beams of different colors to one color beam, the optical device comprising:

a first and a second color-selective reflector arranged on respective transparent substrates, the first reflector reflecting a first and transmitting a second of said sub-beams, the second reflector reflecting the first and second sub-beams, a third of said sub-beams passing through the second reflector and its substrate;

a transparent substrate arranged in the path of only the first sub-beam and having a product of refractive index and thickness equal to that of the substrates of the first and second reflectors, wherein each sub-beam effectively passes through a substrate having a product of refractive index and thickness equal to that of the second substrate; and an astigmatism correcting element in the path of the color beam.

4. A colour image projection apparatus comprising three primary image sources for supplying three differently coloured images of one scene, a beam recombination device for combining three sub-beams emitted by the image sources to one colour beam and a projection lens system for projecting said beam on a projection screen, characterized in that the beam recombination device is a device as claimed in claim 3.

* * * * *